United States Patent
Kobayashi et al.

[15] 3,643,578
[45] Feb. 22, 1972

[54] PHOTOGRAPHIC CAMERA LENS AND DIAPHRAGM-MOUNTING MECHANISM

[72] Inventors: Tatsuo Kobayashi, Kaizuka; Keisuke Maeda, Osaka; Kyozo Uesugi, Sakai, all of Japan

[73] Assignee: Minolta Camera Kabushiki Kaisha, Osaka, Japan

[22] Filed: Feb. 9, 1970

[21] Appl. No.: 9,717

[30] Foreign Application Priority Data

Feb. 18, 1969 Japan....................................44/12094
Mar. 19, 1969 Japan....................................44/21049

[52] U.S. Cl...............................................95/64 B, 95/42
[51] Int. Cl..............................................................G03b 9/07
[58] Field of Search ..........................95/64 R, 64 B, 44 R, 42

[56] References Cited

UNITED STATES PATENTS 2,966,105  12/1960  Schutz....................................95/64 B
3,489,071  1/1970   Mohr et al............................95/64 B

FOREIGN PATENTS OR APPLICATIONS

44/2538  2/1969  Japan....................................95/64 B
778,209  7/1957  Great Britain........................95/64 B Primary Examiner—Joseph F. Peters, Jr.
Attorney—Watson, Cole, Grindle and Watson

[57] ABSTRACT

A lens and diaphragm mounting barrel mechanism for a photographic camera. The mechanism comprises a fixed barrel and a rotatable barrel interconnected by helicoid structures to cause relative axial movement of the rotatable barrel in response to rotation thereof. A diaphragm is mounted within the rotatable barrel and is interconnected with the fixed barrel to prevent its rotation relative to the latter.

3 Claims, 5 Drawing Figures

INVENTOR
Tatsuo Kobayashi
Keisuke Maeda
Kyozo Usugi
BY
Watson, Cole, Grindle & Watson
ATTORNEY

PHOTOGRAPHIC CAMERA LENS AND DIAPHRAGM-MOUNTING MECHANISM

BACKGROUND OF THE INVENTION

Except for fixed focal point type cameras, distance adjustment in ordinary cameras is accomplished by moving the lenses longitudinally of the optical axis of the camera, and the diaphragm is generally supported in the lens barrel to insure proper exposure conditions.

There are three known structures for accomplishing movement of the lens barrel: (1) combination of a double helicoid and a beeline key; (2) set of helicoids, a set of rotatable fitting portions and a beeline key; and (3) a rotary means comprising a set of helicoids for axially moving the lens barrel in response to rotation thereof. The former two structures have many parts, and the construction thereof complicated is complicated. Accordingly rotary means are preferable.

It is preferred that the operating means for the diaphragm device be located on the camera body or on the side of the fixed lens barrel in order to facilitate adjustment of the diaphragm. Further, it would be desirable to be able to preset the diaphragm value and yet be able to adjust the image and the exposure with the diaphragm in its full open state, the diaphragm being stopped down to its preset value in connection with the shutter release operation. None of cameras the prior art have included all of these desirable features.

SUMMARY OF THE INVENTION

The primary object of the present invention is to provide a lens and diaphragm mounting device which permits diaphragm manipulation to be carried out by means of a diaphragm-adjusting device disposed on the camera body side or the fixed barrel of a camera having the rotary lens-adjusting means.

A second object of the present invention is to provide such a mounting device wherein the diaphragm is incorporated in the lens system in a barrel movable in the optical axis direction the diaphragm being fixed in a regular position relative to the photosensitive surface to standardize the distance between the diaphragm device and the film surface regardless of movement of the lens system in the optical axis direction.

Another object of the present invention is to permit the adjustment and control of the diaphragm device to be carried out from the camera body side or the fixed barrel in a camera having rotary adjustment means and wherein the diaphragm device is movable in the optical axis direction together with the rotatable barrel and yet at the same time is supported against rotation.

DESCRIPTION OF THE PREFERRED EMBODIMENT

Figure 1:
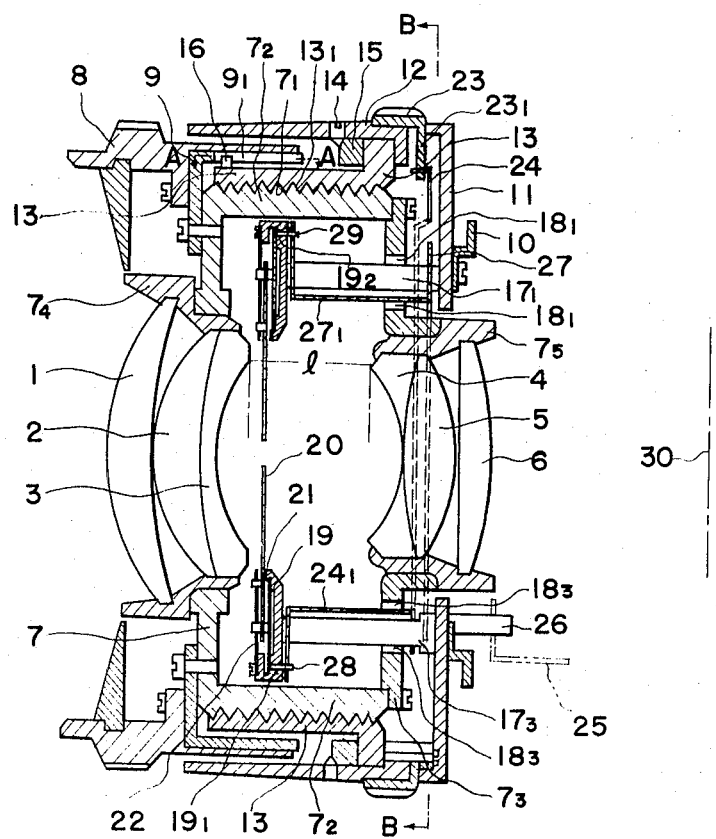
FIG. 1 is a longitudinal section of a lens and diaphragm mounting mechanism constructed in accordance with the present invention.
Figure 2:
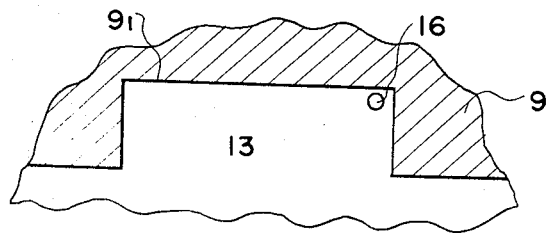
FIG. 2 is an enlarged cross-sectional view taken along line A—A in FIG. 1.
Figure 3:
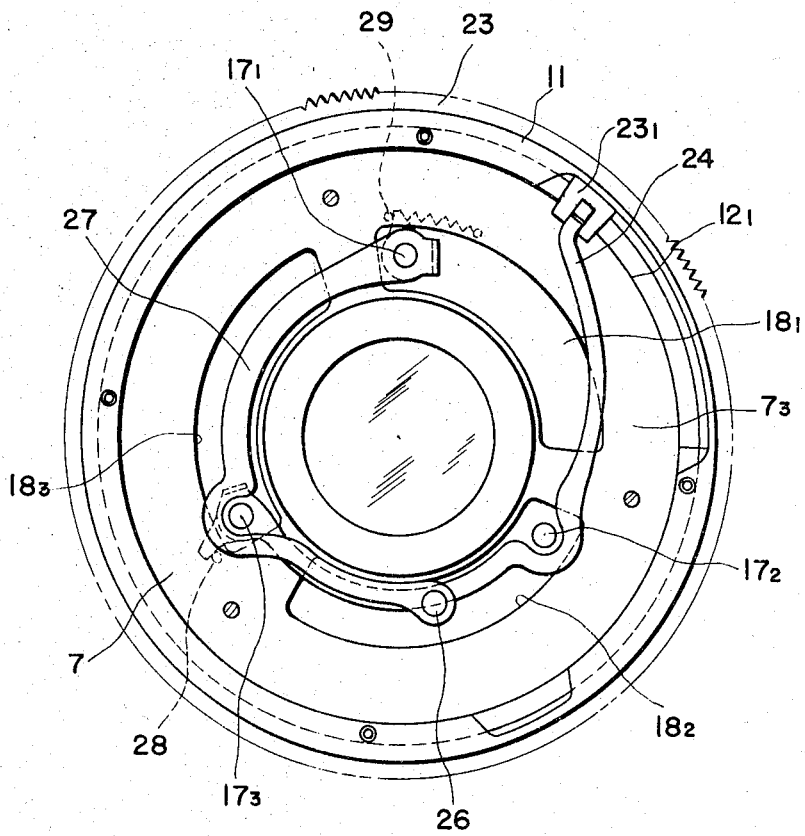
FIG. 3 is a cross-sectional view taken along line B—B in FIG. 1.

In the first embodiment in accordance with the present invention shown in FIGS. 1, 2 and 3, the diaphragm device is located in the barrel movable in the optical axis direction and is supported against movement in either the rotary direction or along the optical axis.

Rotary delivery type lens barrel 7 is composed of male helicoid tube $7_2$ having a male helicoid $7_1$ on its outer surface, front lens holding portion $7_4$ fixed on the front end of said male helicoid tube $7_2$, rear plate $7_3$ fixed to the rear end of said male helicoid tube $7_2$, and rear lens holding portion $7_5$ fixed to said rear plate $7_3$. Lenses 1, 2, 3, 4, 5 and 6 form a lens system held by said lens-holding portions $7_4$, $7_5$, and present lens space $l$ between lenses 3 and 4 in which a diaphragm device having diaphragm blades 20 is interposed space $l$ is slightly larger than the moving distance along the optical axis direction in which said lens barrel 7 is moved from the infinite to a very short photographing distance.

Onto the periphery of the front end of male helicoid $7_2$ of said lens barrel 7 are fixed distance ring 8 and stopper ring 9, and said stopper ring 9 is extended having a clearance above male helicoid tube $7_2$ and notch portion $9_1$ is formed thereon as shown in FIG. 2. The depth of said notch 9 is a little longer than the distance of movement of the lens barrel from the infinite photographing to very short distance photographing, and the length of the arch surface width of said notch portion $9_1$ which meets at right angles with said depth is formed equivalently to the angle through which lens barrel 7 rotates when said movement is effected.

Outer tube 12 is fixed to barrel baseplate 11 which has a bayonet or screw fitting portion 10 facilitating attachment to the camera body. A female helicoid tube 13 is fixed onto tube 12 through adjusting members 14, 15 to mesh with male helicoid $7_1$ of helicoid tube $7_2$ of said lens barrel 7, and the front end of said female helicoid tube 13 is inserted into the clearance between male helicoid tube $7_2$ stopper ring 6. A pin 16 mounted on the periphery of the front end of said female helicoid tube 13 projects into notch portion $9_1$ provided on said stop ring 9. When lens barrel 7 is in the infinite photographing distance said pin 16 is in the deepest position on the right side edge of notch portion $9_1$ as shown in FIG. 2 and when said lens barrel 7 comes to the very short photographing distance said pin 16 engages with the shallow position on the left side edge of notch $9_1$ to check the further rotation of lens barrel 7.

On barrel base plate 11 there are mounted three struts $17_1$, $17_2$, $17_3$ for holding the diaphragm device and as shown in FIG. 3 said struts $17_1$, $17_2$, $17_3$ pass through three arcuated slots $18_1$, $18_2$, $18_3$ provided on rear plate $7_3$ of lens barrel tube 7. Therefore, the arcuated length of said slots should be equivalent to the rotary angle through which lens barrel tube 7 is adjusted.

To the ends of struts $17_1$, $17_2$, $17_3$ there is fixed diaphragm blade case 19 of the diaphragm device, on which diaphragm blades 20, blade control plate 21, and blade keep plate 22 for forming the well-known diaphragm device are provided.

A diaphragm adjustment ring 23 is rotatably mounted on the rear portion on the periphery of outer tube 12 and the diaphragm is preset by indexes graduated on the periphery of outer tube 12 and diaphragm scales graduated on diaphragm ring 23 as is well known. Control portion $23_1$ of said diaphragm setup ring 23 passes through long slot $12_1$ provided on outer tube 12 and projects into the inside of said outer tube. Lever 24 for control portion $23_1$ is rotatable using strut $17_3$ as a center and is formed to work so as not to come into contact with struts $17_2$. Bent portion $24_1$ of said setup lever 24 passes through arcuated slot $18_3$ to project into the inside of lens barrel 7 and engages with setup pin 28 which projects through slot $19_1$ provided on diaphragm blade case 19 from blade control 21 of the diaphragm device.

Bent portion $27_1$ of working lever 27 engages with working pin 29 which projects through another slot $19_2$ provided on diaphragm blade case 19 and projects rearward through another arcuated slot $18_1$ provided on bottom plate $7_3$ of lens barrel tube 7. Working lever 27 is supported rotatably along rear plate $7_3$ using strut $17_1$ as a center, and auto-preset diaphragm pin 26 projected from said working lever 27 engages with driving lever 25 for working in interlocking connection with the shutter release operation not shown in the drawings.

Reference numeral 30 shown by a broken line denotes a photosensitive film surface.

In said first embodiment, the diaphragm device is fixed so as not to rotate together with lens barrel tube 7 and also not to move in the optical axis direction. Therefore, in order to interpose the diaphragm device in the lens system, as described above any lens space *l* is required to be larger than the moving distance in the optical axis direction of the lens barrel tube. However, the diaphragm device is in an immovable position to photosensitive film surface 30 shown in FIG. 1. When focusing is in the infinite the diaphragm device comes near to lens 3 and when focusing is in the short distance the diaphragm device comes near to lens 4. For example, therefore, when the lens system is formed of Gaussian-type lenses, in general the effective diameter of light rays coming to the front of the rear lens group will be smaller than those coming from the rear of the front lens group, therefore, the F number of the lens is variable in accordance with the photographing distance. However, according to the present invention, compensating therefor is possible.

Figure 4:
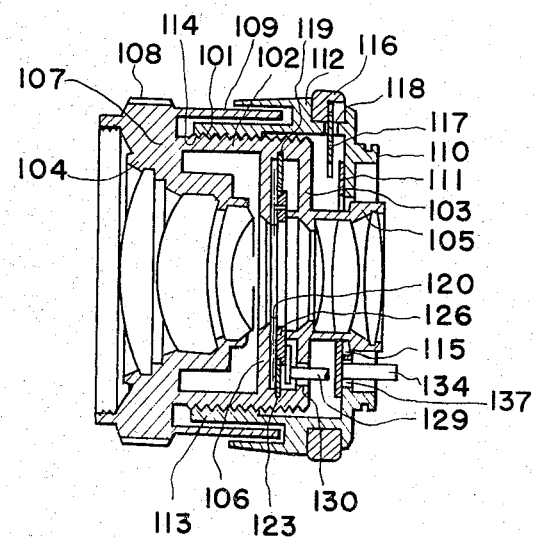
FIG. 4 is a longitudinal view of another form of mechanism constructed in accordance with the present invention.
Figure 5:
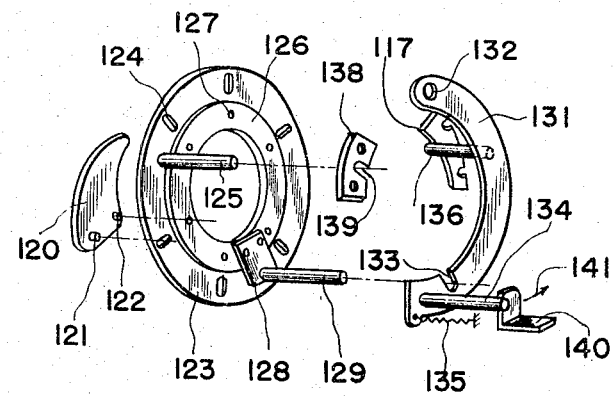
FIG. 5 is a perspective, exploded view showing the diaphragm device, the rotation check member and the diaphragm control member of the embodiment shown in FIG. 4.

In the second embodiment in accordance with the present invention shown in FIG. 4 and FIG. 5, the diaphragm device is movable in the optical axis direction together with the lens barrel and is supported so as to check rotation, and yet it is possible to manipulate or control the diaphragm device from the camera body side or the fixed barrel side.

Lens barrel 107 for bearing the lens system is composed of male helicoid portion 102 presenting male helicoid 101 on its periphery, rear plate 103 for said male helicoid portion 102, the rear lens holding portion 104 connected thereto, the front lens holding portion 105 connected to the front end of the male helicoid portion, collar 106 projecting inward from male helicoid portion 102 between lens-holding portions 014 and 105, annular slot 119 formed in the inside right behind said collar 106, distance ring 108 formed on the front periphery of male helicoid portion 102, and cover tube 109 extending rearward from said distance ring 108 with clearance left between male helicoid portion 102 and said cover tube 109.

On the central portion of baseplate 111 of fixed barrel 112 where a fitting 110 for connecting the devices to the camera body is provided, a hole 115 is provided for receiving rear lens-holding portion 105 of lens barrel 107 therethrough. Female helicoid portion 113 extends forward of fixed barrel 112 and presents female helicoid 114 which is formed so as to engage with male helicoid 101 of said lens barrel 107. On the rear end on the periphery of fixed barrel 112 a diaphragm setup ring 116 is rotatably mounted, and setup cam 117 thereof passes through slot 118 provided on fixed barrel 112 to project into the inside thereof.

As for the diaphragm device, as shown clearly in FIG. 5, annular disk 123 is provided with slots 124 which extend in the radial direction and in which one of pins 121 provided on diaphragm blade 120 is fitted. Disc 123 is fitted rotatably in annular slot 119 provided inside said male helicoid portion 102 on its periphery and holds diaphragm blades 120 between collar 106 and said annular disk 123.

Said annular disk 123 has holding pin 125 mounted thereon to project rearward and disc 123 rotatably supports diaphragm control plate 126 concentrically in the inside thereof. Into a small hole 127 provided on said diaphragm control plate 126 another pin 122 provided on each of said diaphragm blades 120 is fitted to open or close said diaphragm blades 120 through relative rotation of annular disk 123 and diaphragm control plate 126.

On fitting portion 128 which is mounted fixedly on the back of diaphragm control plate 126, a control pin 129 is mounted to project rearward to pass through arcuated slot 130 provided on rear plate 103 of lens barrel 107 and fit slidably in the optical axis direction into fork portion 133 formed on the inside edge of C-shaped arch lever 131 which is connected rotatably in pin hole 132 to a pin (not shown in the drawings) provided inside baseplate 111 of fixed barrel 112. And, in the same way holding pin 125 mounted on annular disk 123 also passes through another arcuate slot provided on rear plate 103 of lens barrel 107 to project rearward and fit slidably in the optical axis direction into fork portion 139 provided on holding plate 138 fixed to the inside of fixed barrel 112.

Automatic diaphragm interlocking pin 134 mounted on the back of said arch lever 131 passes through arch slot 137 provided on baseplate 111 of fixed barrel 112 and projects rearward to engage with the side margin of working lever 140. Said working lever 140 is mounted on the camera body and is movable in the direction shown by arrow 141 at the beginning of release operation. Pins 134 and lever 150 are pressed into contact with each other by means of spring 135 provided on arch lever 131. Movement of said working lever 140 in the direction shown by said arrow 141 causes arch lever 131 to rotate counterclockwise in FIG. 5 to operate so as to rotate plate 126 through working pin 129.

On said arch lever 131 there is mounted a pin 136 which cooperates with setup cam 117 mounted on diaphragm setup ring 116 to restrict the counterclockwise rotation of arch lever 131 to bring diaphragm blades 120 to a preset diaphragm value.

In this embodiment, even though lens barrel 107 is rotated during focusing the diaphragm device in the lens barrel is held against rotation by the cooperation between holding pin 125 and holding plate 138, which is fixed, on fixed barrel 112. Annular disk 123 merely slides in contact with annular slot 119.

To permit movement of lens barrel 107 in the optical axis direction, holding pin 125 slides in fork portion 139 of holding plate 138 and therefore the diaphragm device may move in the optical direction together with the lens barrel to retain its normal position relative to the lens system.

We claim:

1. A lens and diaphragm mounting barrel mechanism for a photographic camera comprising:
   a fixed barrel;
   a lens barrel, said barrels being coaxially aligned and each being provided with mating, interengaged helicoid structures whereby relative rotation of the barrels cause relative axial movement thereof;
   a set of lenses mounted coaxially within said lens barrel;
   a diaphragm structure disposed within the lens barrel in coaxial alignment with said lenses, said structure comprising a pair of rings relatively rotatable to adjust the opening of the diaphragm,
   said lens barrel having an end plate disposed transversely of the common axis of the barrels, there being an arcuate slot in said plate disposed to extend generally circumferentially of the axis of said barrels;
   linkage interconnecting one of said rings and said fixed barrel for preventing relative rotation therebetween about said axis, said linkage including a member extending longitudinally of the axis and through said arcuate slot; and
   automatic diaphragm-operating means coupled with the other of said rings for positioning the latter to correspond to a predetermined diaphragm opening in response to actuation of the shutter release of the camera.

2. Barrel mechanism as set forth in claim 1 wherein said diaphragm is mounted in said lens barrel for axial movement therewith and for rotation relative thereto about said axis, said fixed barrel included means defining an axially extending hole slidably receiving said member therein.

3. Barrel mechanism as set forth in claim 1 wherein said diaphragm is supported against axial movement relative to said fixed barrel by said member and said lens barrel is axially movable relative thereto.

* * * * *